United States Patent [19]
Nakayama

[11] Patent Number: 5,341,437
[45] Date of Patent: Aug. 23, 1994

[54] METHOD OF DETERMINING THE CONFIGURATION OF A PATH FOR MOTOR VEHICLE

[75] Inventor: Shigeto Nakayama, Wako, Japan

[73] Assignee: Honda Giken Kogyo Kabushiki Kaisha, Tokyo, Japan

[21] Appl. No.: 16,656

[22] Filed: Feb. 9, 1993

Related U.S. Application Data

[63] Continuation of Ser. No. 631,910, Dec. 21, 1990, abandoned.

[30] Foreign Application Priority Data

Dec. 22, 1989 [JP] Japan .................. 1-334127

[51] Int. Cl.$^5$ .......... G06K 9/00; G06K 9/54; G06F 7/70; H04N 7/00
[52] U.S. Cl. .......... 382/1; 382/49; 364/424.02; 348/118
[58] Field of Search ............ 382/1, 16, 43, 49, 48; 901/47; 358/103; 364/424.02, 461; H04N 7/00

[56] References Cited

U.S. PATENT DOCUMENTS 4,868,572 9/1989 Fujii et al. .................. 358/103
4,970,653 11/1990 Kehue .................. 364/461

OTHER PUBLICATIONS

McCash, D. "Smart Highways", *Popular Science*, vol. 235, No. 5, p. 119, Nov. 1989.

*Primary Examiner*—David K. Moore
*Assistant Examiner*—Michael R. Cammarata
*Attorney, Agent, or Firm*—Lyon & Lyon

[57] ABSTRACT

The configuration of a path for motor vehicles is recognized on the basis of image data produced by a television camera or the like. Feature points contained in original image data of the path are determined, and a group of straight lines approximating the array of the feature points are also determined. From the group of straight lines, there are extracted straight lines which are effective to determine boundaries of the path. The extracted straight lines divided into a plurality of line segments by points of intersection between the straight lines. The line segments are then checked against the feature points of the original image data to determine whether the line segments correspond to the boundaries of the path. The original image data may be divided into a plurality of areas, and the above process may be carried out with respect to the image data in each of the areas.

12 Claims, 21 Drawing Sheets

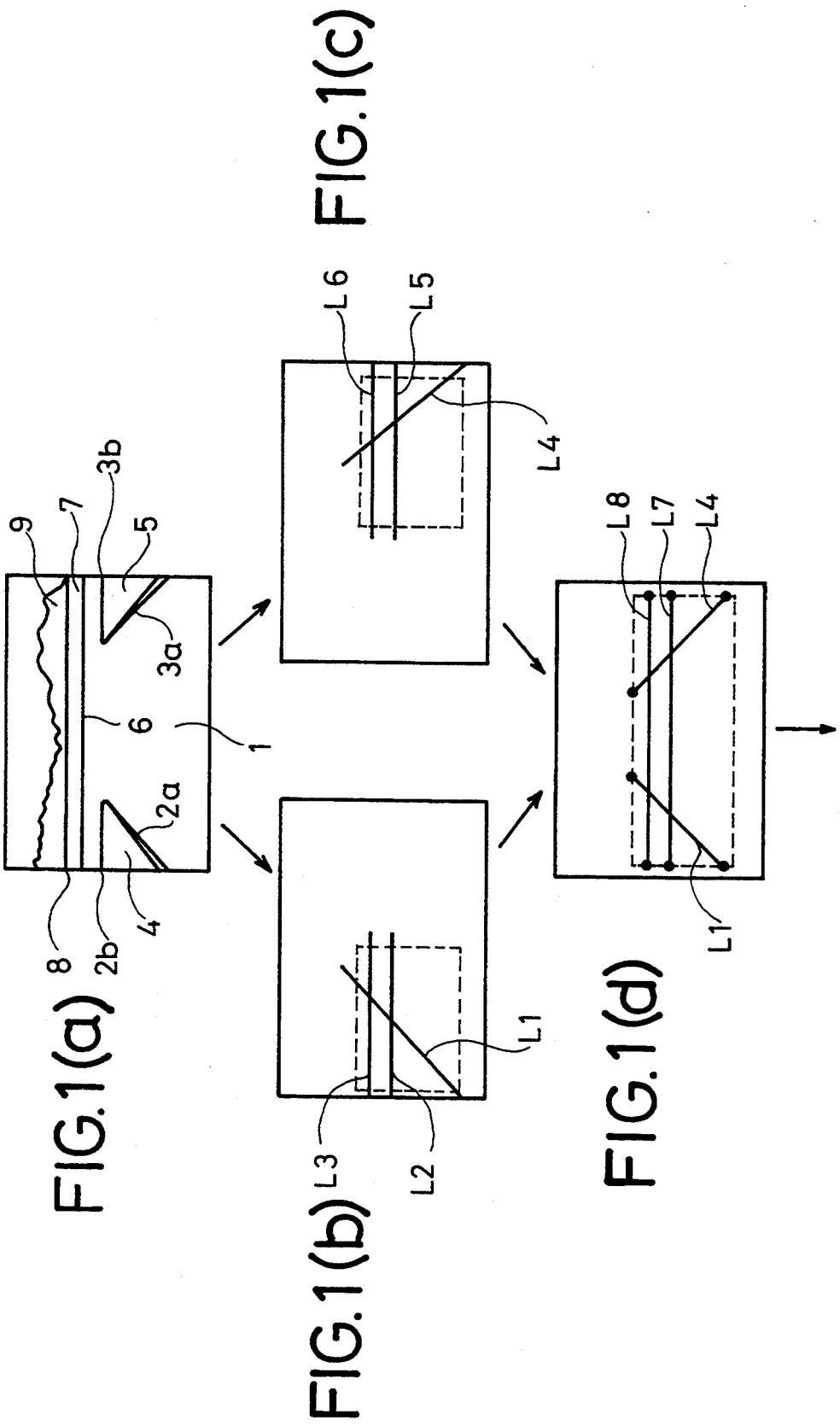

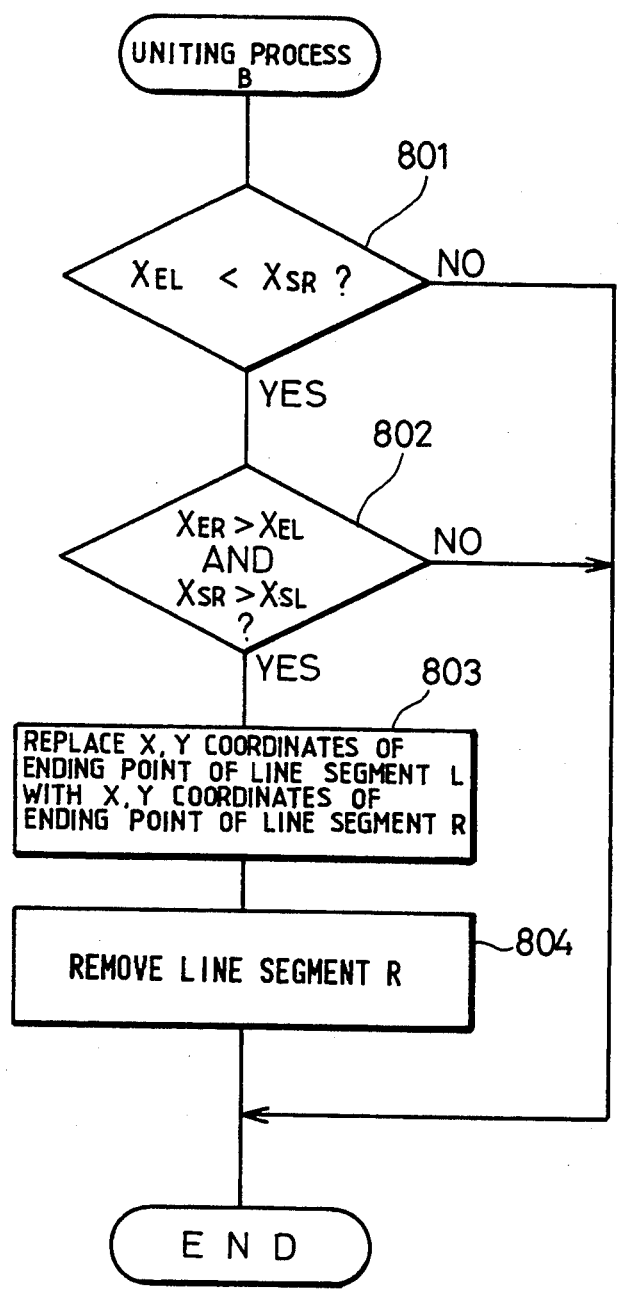

RIGHTHAND STARTING POINT

RIGHTHAND ENDING POINT

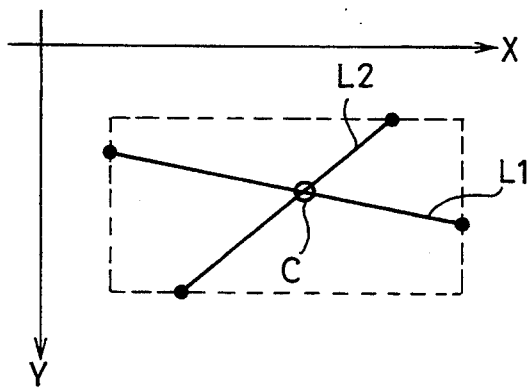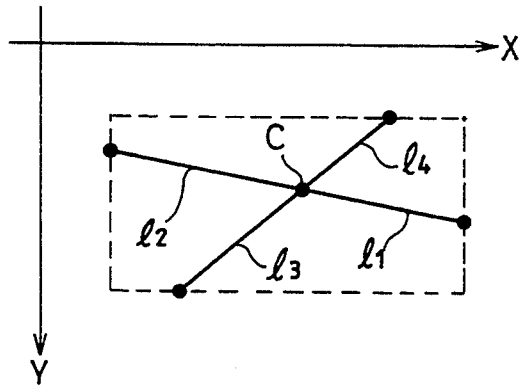

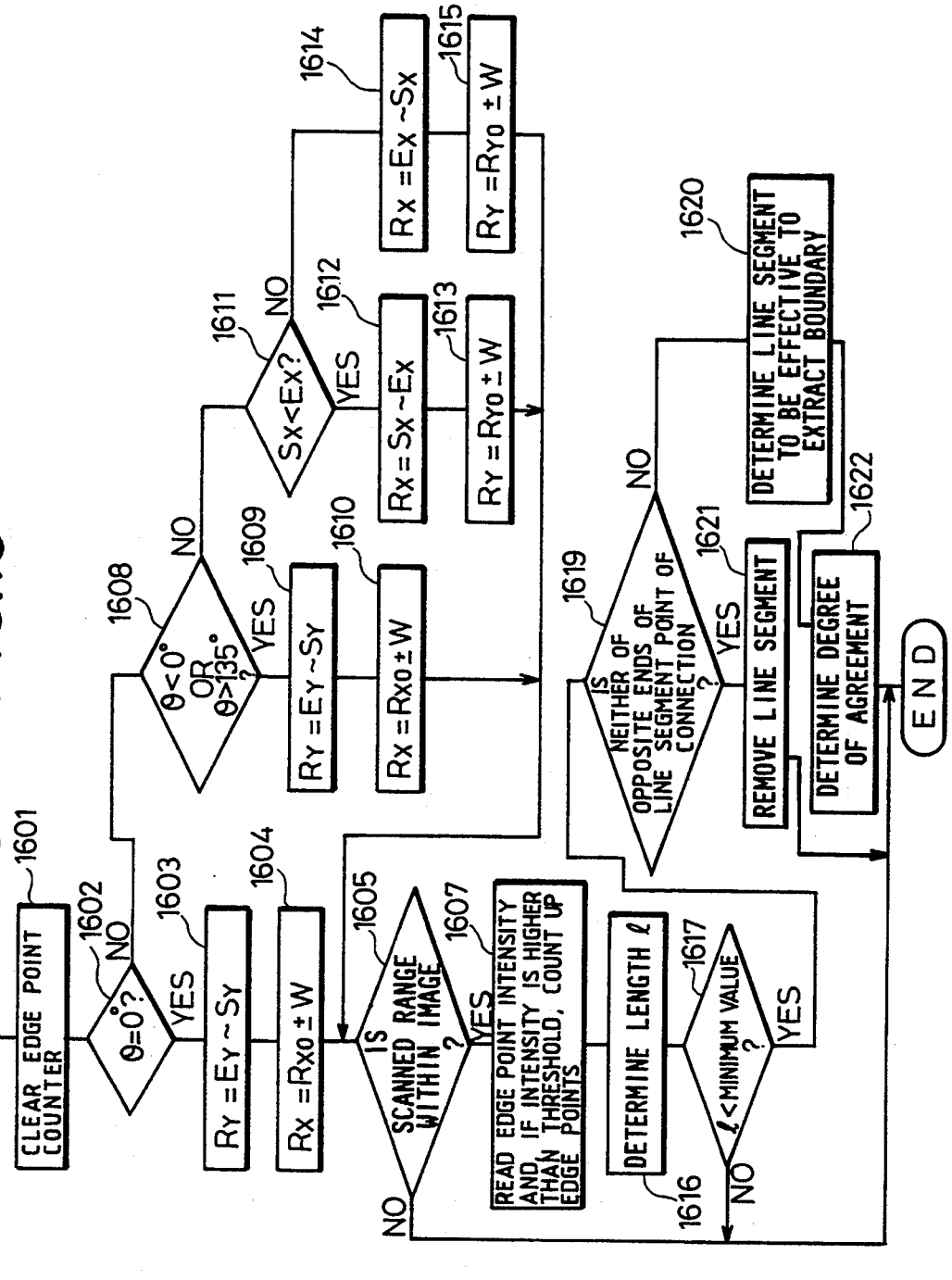

METHOD OF DETERMINING THE CONFIGURATION OF A PATH FOR MOTOR VEHICLE

This application is a continuation application of application Ser. No. 07/631,910, filed on Dec. 21, 1990, now abandoned.

BACKGROUND OF THE INVENTION

1. Field of the Invention

The present invention relates to a method of determining or recognizing the configuration of a path for motor vehicles through image processing, and more particularly to a method of recognizing boundaries of a path irrespective of the configuration of the path.

2. Prior Art

Recognition of the configuration of a path for motor vehicles requires that boundaries of the path at an end thereof be determined. To determine the boundaries of a path at an end thereof, it is necessary to process image data of the path at the end thereof, which are produced by a television camera or the like, and to extract line segments from the processed image data at the end of the path. One image processing method employs the Hough transformation as disclosed in Japanese Laid-Open Patent Publications Nos. 62(1987)-24310 and 62-70916. According to the disclosed process, feature points on an image produced by the image data are subjected to the Hough transformation, thereby producing a group of straight lines corresponding to the distribution of the feature points.

If the path to be recognized is straight, then the above conventional method based on the image processing can directly utilize the detected straight lines produced by way of the Hough transformation. If the path is curved or branched, however, the detected straight lines produced by way of the Hough transformation cannot be utilized as they are. In such a case, it has been customary to divide an image produced by a television camera into a plurality of small processing areas, and repeatedly detect line segments in the processing areas successively from a closest small area in the image, so that information accurately representing the boundaries of an actual path can be obtained.

With the conventional method, therefore, sequential steps are required to determine the configuration of a path, and the overall process is time-consuming. Accordingly, it has been difficult to apply the conventional method to the control of running of an automobile along paths since the automobile running control or guidance process requires quick data processing.

SUMMARY OF THE INVENTION

It is a major object of the present invention to provide a method of determining the configuration of a path for motor vehicles, the method being capable of easily and quickly determining boundaries of the path.

According to the present invention, there is provided a method of determining the configuration of a path for motor vehicles, comprising the steps of producing original image data of the path, determining feature points contained in the original image data, determining a group of straight lines approximating the array of the feature points, extracting straight lines, effective to determine boundaries of the path, from the group of straight lines, dividing the extracted straight lines into a plurality of line segments by points of intersection between the straight lines, and checking the line segments against the feature points of the original image data to determine whether the line segments correspond to the boundaries of the path.

The step of determining feature points comprises the step of producing edge data by differentiating the original image data. The step of determining a group of straight lines comprises the step of effecting the Hough transformation on the edge data.

The step of extracting straight lines comprises the steps of determining whether the X coordinate of the starting point of one straight line is larger than the X coordinate of the starting point of another straight line, and whether the X coordinate of the ending point of the one straight line is larger than the X coordinate of the ending point of the other straight line, and determining a straight line which interconnects the starting point of the one straight line and the ending point of the other straight line, to be an effective straight line if the x coordinate of the starting point of the one straight line is larger than the X coordinate of the starting point of the other straight line and the x coordinate of the ending point of the one straight line is larger than the X coordinate of the ending point of the other straight line.

The step of extracting straight lines comprises the steps of determining whether the Y coordinate of the starting point of one straight line is larger than the Y coordinate of the starting point of another straight line, and whether the Y coordinate of the ending point of the one straight line is larger than the Y coordinate of the ending point of the other straight line, and determining a straight line which interconnects the starting end of the one straight line and the ending point of the other straight line, to be an effective straight line if the Y coordinate of the starting point of the one straight line is larger than the Y coordinate of the starting point of the other straight line and the Y coordinate of the ending point of the one straight line is larger than the Y coordinate of the ending point of the other straight line.

The step of extracting straight lines comprises the steps of determining whether the Y coordinate of the starting point of one straight line is smaller than the Y coordinate of the starting point of another straight line, and whether the Y coordinate of the ending point of the one straight line is smaller than the Y coordinate of the ending point of the other straight line, and determining a straight line which interconnects the ending point of the one straight line and the starting point of the other straight line, to be an effective straight line if the Y coordinate of the starting point of the one straight line is smaller than the Y coordinate of the starting point of the other straight line and the Y coordinate of the ending point of the one straight line is smaller than the Y coordinate of the ending point of the other straight line.

The step of dividing the extracted straight lines comprises the steps of defining one straight line as a master line segment and another straight line as a slave line segment, determining whether the master and slave line segments are parallel to each other, determining a point of intersection between the master and slave line segments if the master and slave line segments are not parallel to each other, determining whether the point of intersection is positioned between the starting and ending points of the master and slave line segments, and dividing the master and slave line segments by the point of intersection if the point of intersection is positioned between the starting and ending points of the master and slave line segments.

The step of checking the line segments comprises the steps of scanning an edge image over a predetermined width across a line segment, comparing the intensity of the edge point of each dot which is scanned, with a predetermined threshold, counting edge points whose intensity is higher than the predetermined threshold, calculating the ratio of the number of the counted edge points to the length of the line segment, and determining whether the line segment corresponds to a boundary of the path based on the calculated ratio.

According to the present invention, there is also provided a method of determining the configuration of a path for motor vehicles, comprising the steps of producing original image data of the path, dividing the original image data into a plurality of areas, determining feature points contained in each of the areas, determining a group of straight lines approximating the array of the feature points in each of the areas, extracting straight lines, effective to determine boundaries of the path, from the group of straight lines in each of the areas, uniting the extracted straight lines in each of the areas into a single combination of image data representing a single straight line, dividing the single straight line into a plurality of line segments, and checking the line segments against the feature points of the original image data to determine whether the line segments correspond to the boundaries of the path.

The step of determining feature points comprises the step of producing edge data by differentiating the original image data. The step of determining a group of straight lines comprises the step of effecting the Hough transformation on the edge data.

The step of extracting straight lines comprises the steps of determining whether the X coordinate of the starting point of one straight line is larger than the X coordinate of the starting point of another straight line, and whether the X coordinate of the ending point of the one straight line is larger than the X coordinate of the ending point of the other straight line, and determining a straight line which interconnects the starting point of the one straight line and the ending point of the other straight line, to be an effective straight line if the X coordinate of the starting point of the one straight line is larger than the x coordinate of the starting point of the other straight line and the X coordinate of the ending point of the one straight line is larger than the X coordinate of the ending point of the other straight line.

The step of extracting straight lines comprises the steps of determining whether the Y coordinate of the starting point of one straight line is larger than the Y coordinate of the starting point of another straight line, and whether the Y coordinate of the ending point of the one straight line is larger than the Y coordinate of the ending point of the other straight line, and determining a straight line which interconnects the starting end of the one straight line and the ending point of the other straight line, to be an effective straight line if the Y coordinate of the starting point of the one straight line is larger than the Y coordinate of the starting point of the other straight line and the Y coordinate of the ending point of the one straight line is larger than the Y coordinate of the ending point of the other straight line.

The step of extracting straight lines comprises the steps of determining whether the Y coordinate of the starting point of one straight line is smaller than the Y coordinate of the starting point of another straight line, and whether the Y coordinate of the ending point of the one straight line is smaller than the Y coordinate of the ending point of the other straight line, and determining a straight line which interconnects the ending point of the one straight line and the starting point of the other straight line, to be an effective straight line if the Y coordinate of the starting point of the one straight line is smaller than the Y coordinate of the starting point of the other straight line and the Y coordinate of the ending point of the one straight line is smaller than the Y coordinate of the ending point of the other straight line.

The step of dividing the single straight line comprises the steps of defining one straight line as a master line segment and another straight line as a slave line segment, determining whether the master and slave line segments are parallel to each other, determining a point of intersection between the master and slave line segments if the master and slave line segments are not parallel to each other, determining whether the point of intersection is positioned between the starting and ending points of the master and slave line segments, and dividing the master and slave line segments by the point of intersection if the point of intersection is positioned between the starting and ending points of the master and slave line segments.

The step of checking the line segments comprises the steps of scanning an edge image over a predetermined width across a line segment, comparing the intensity of the edge point of each dot which is scanned, with a predetermined threshold, counting edge points whose intensity is higher than the predetermined threshold, calculating the ratio of the number of the counted edge points to the length of the line segment, and determining whether the line segment corresponds to a boundary of the path based on the calculated ratio.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 1(a) through 1(g) diagrams illustrative of the basic concept of a method according to the present invention;

Figure 6A:
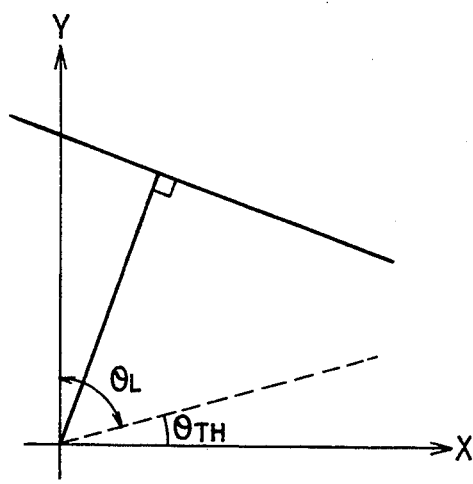
Figure 6B:
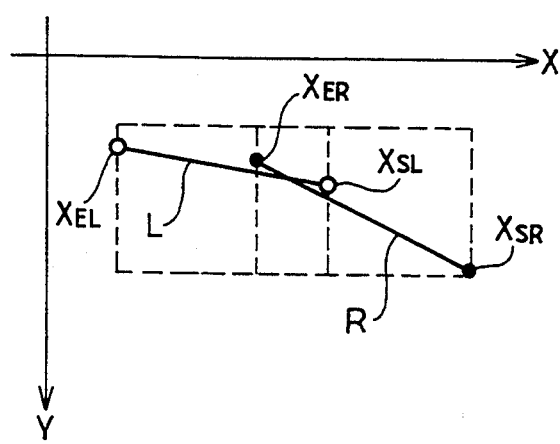
Figure 6C:
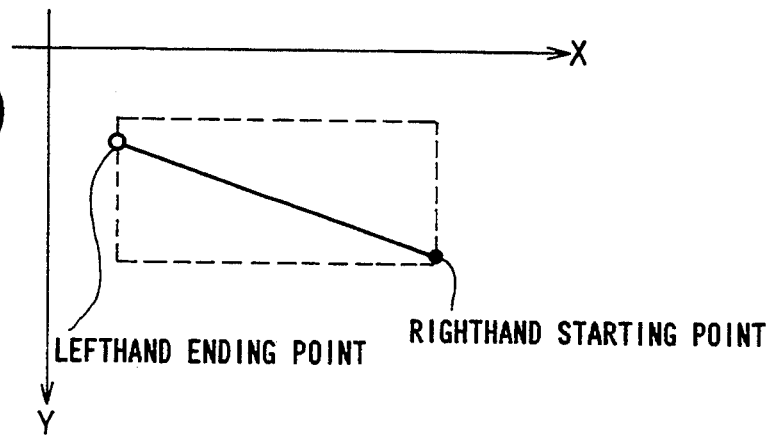
Figure 8A:
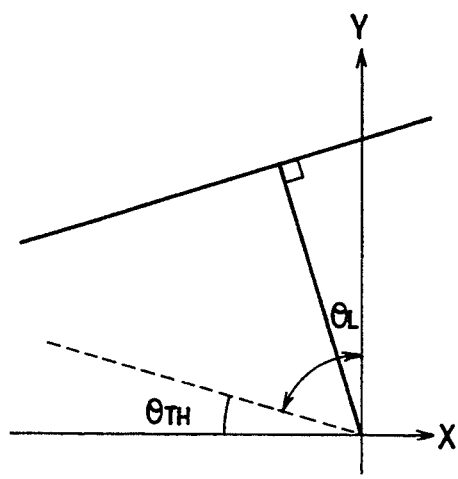
Figure 8B:
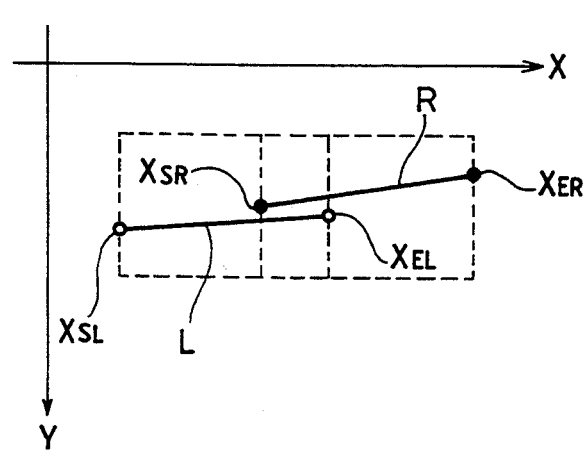
Figure 8C:
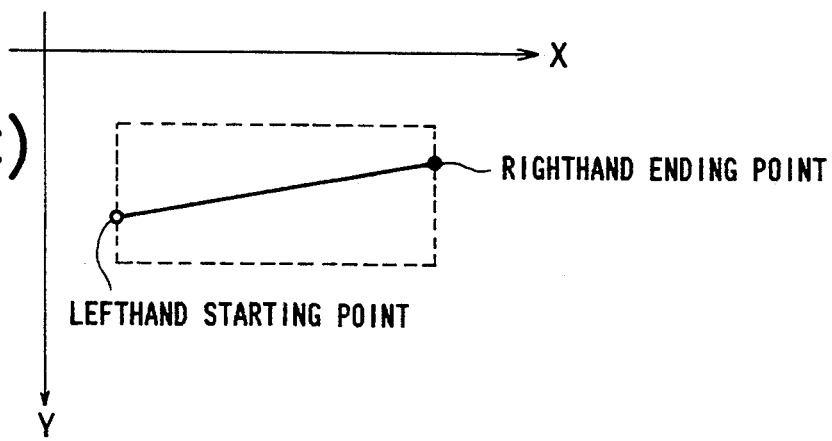
Figure 9A:
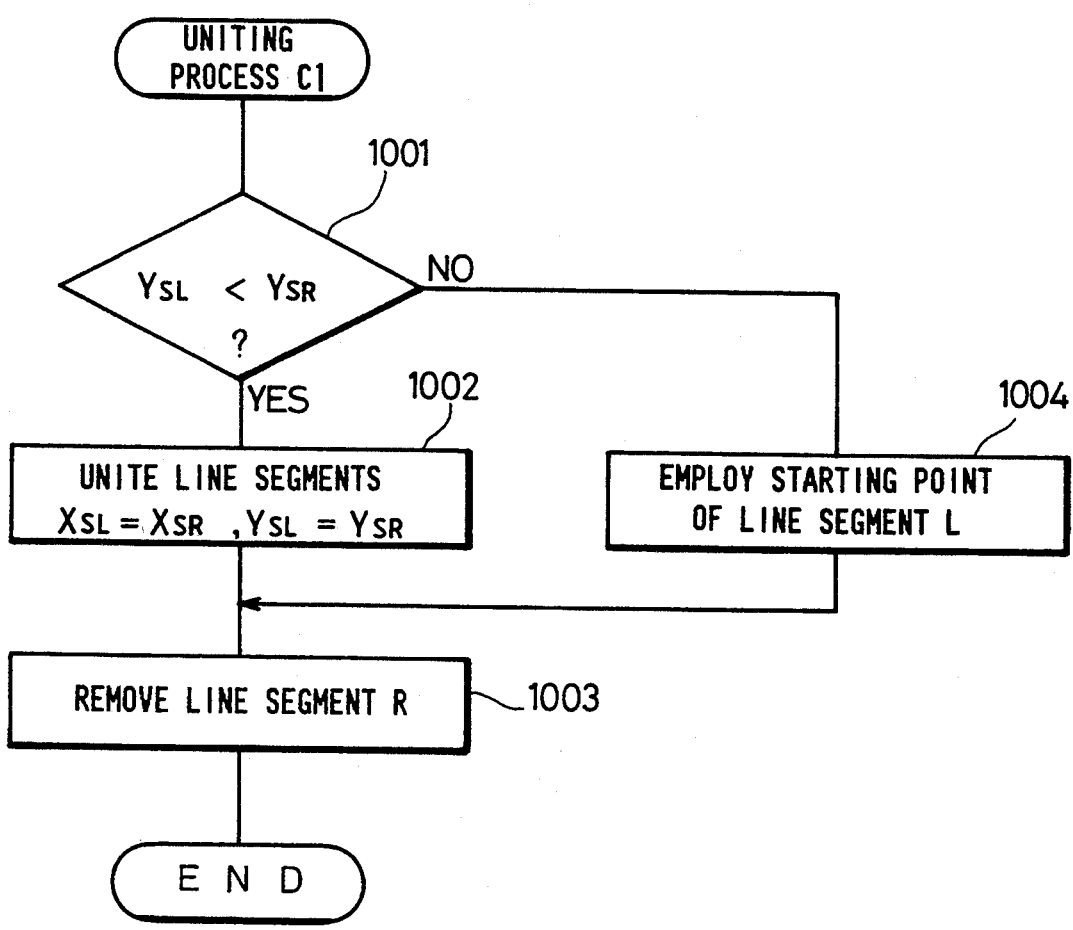
Figure 9B:
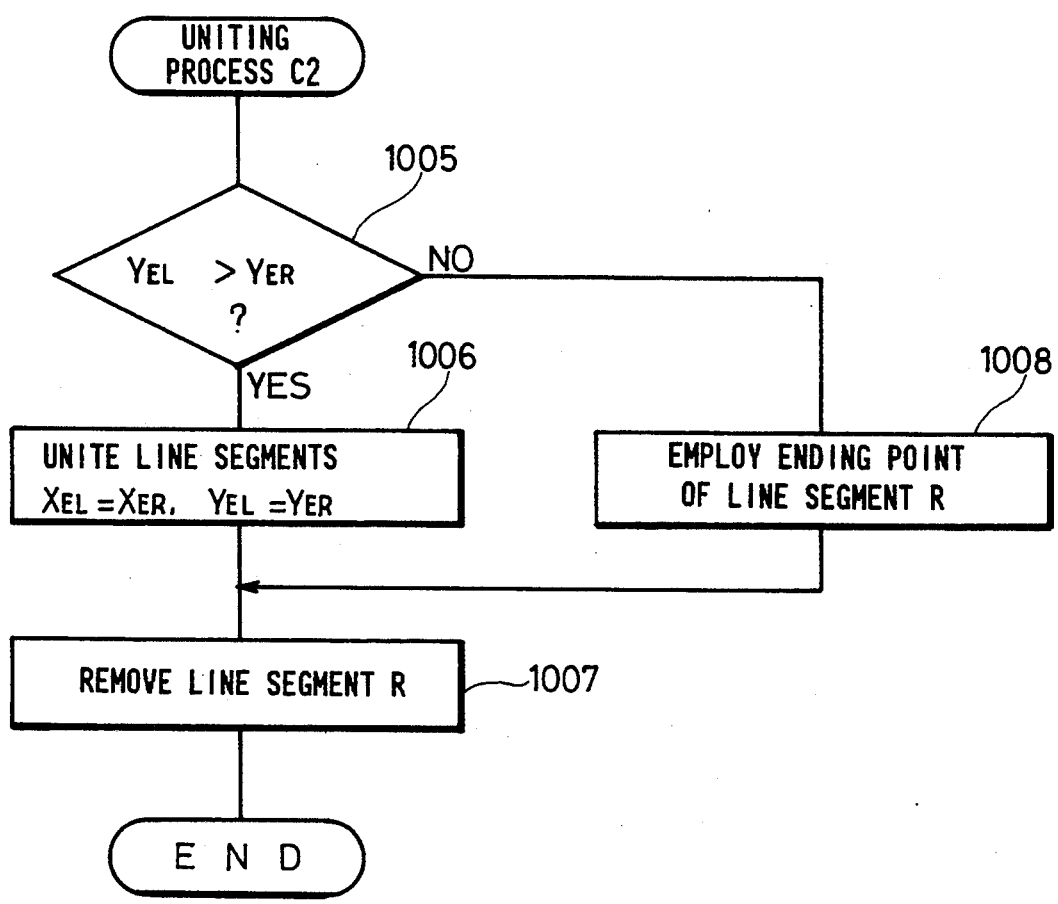
Figure 11:
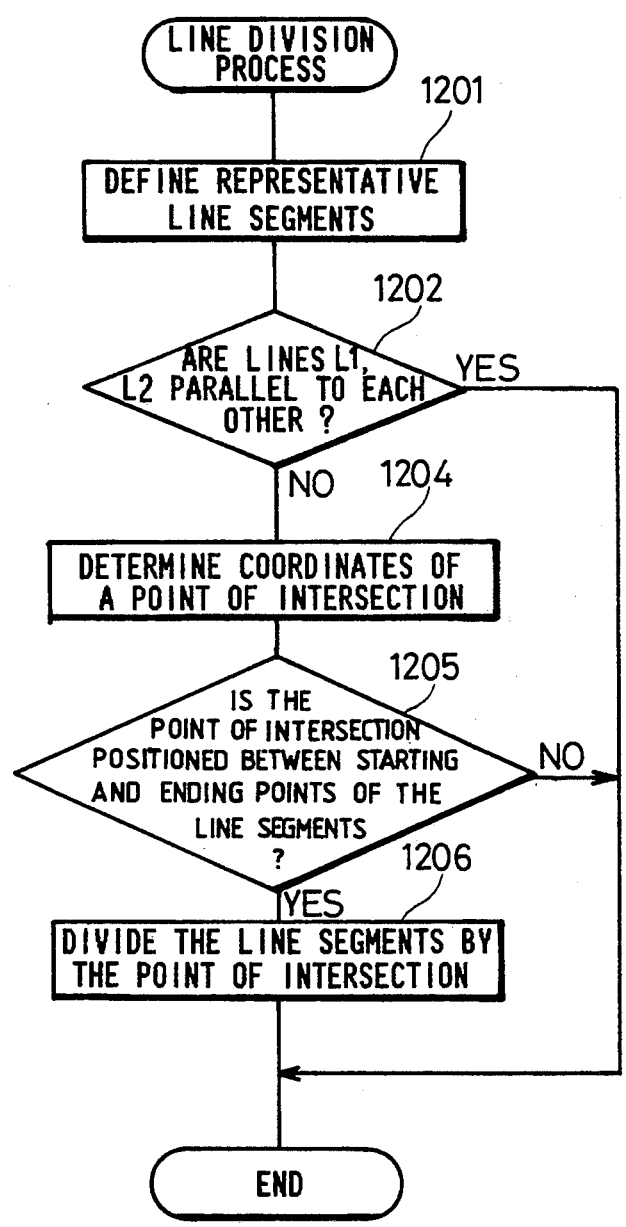
Figure 13A:
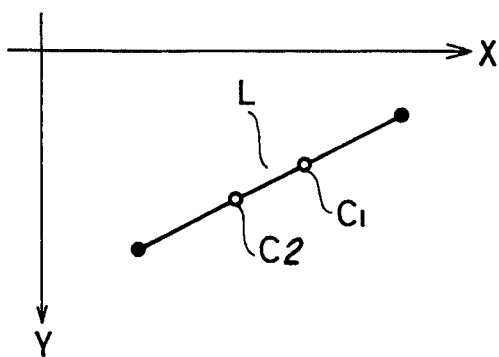
Figure 13B:
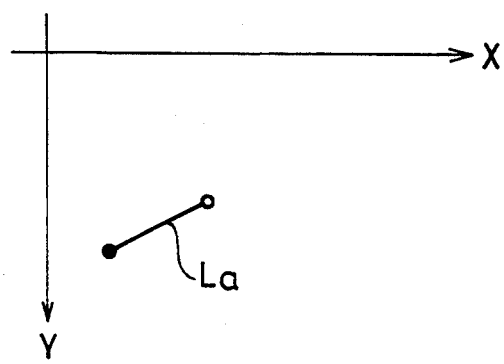
Figure 13C:
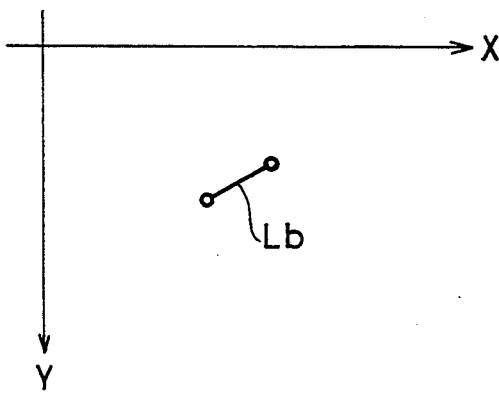
Figure 13D:
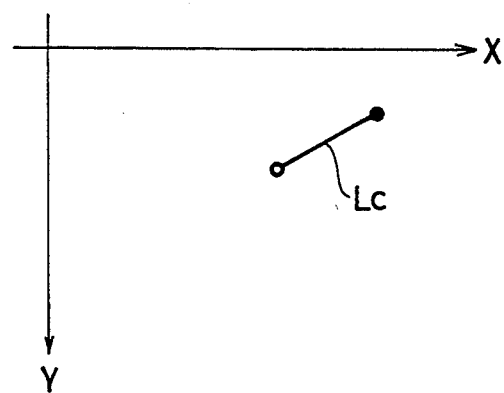
Figure 14A:
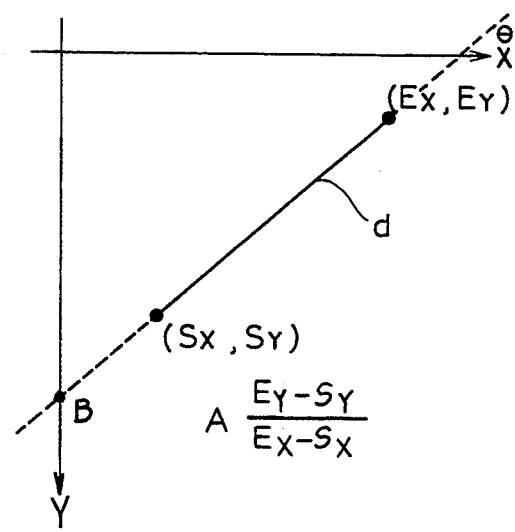
Figure 14B:
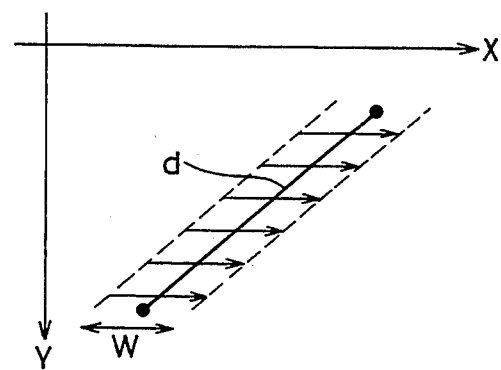
Figure 17A:
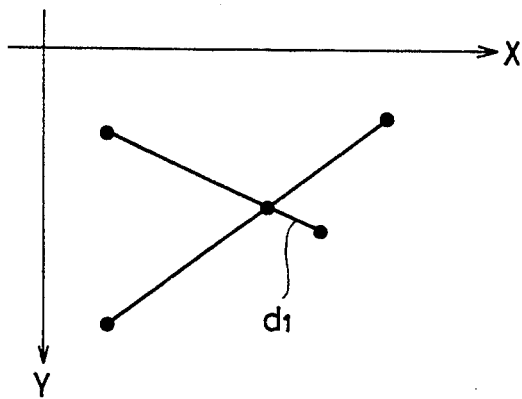
Figure 17B:
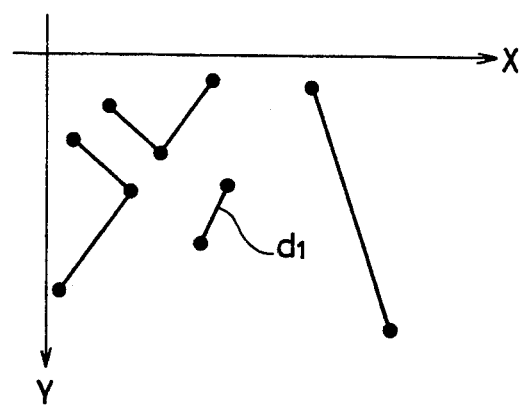

FIG, 5 is a flowchart of a uniting process A;

FIGS. 6(a) through 6(c) are graphs showing the states of line segments in the uniting process A;

FIG. 7 is a flowchart of a uniting process B;

FIGS. 8(a) through 8(c) are graphs showing the states of line segments in the uniting process B;

FIGS. 9(a) and 9(b) are flowcharts of a uniting process C;

FIGS. 10(a) through 10(f) are graphs showing the states of line segments in the uniting process C;

FIG. 11 is a flowchart of a process of dividing representative line segments;

FIGS. 12(a) and 12(b) are graphs showing the states of line segments in the dividing process;

FIGS. 13(a) through 13(d) are graphs illustrative of the separation of divided line segments;

FIGS. 14(a) through 14(b) are graphs illustrative of checking divided line segments against edge data;

FIG. 15 is a flowchart of a process of determining the degree of agreement between the divided line segments and the edge data and also determining the lengths of line segments;

FIGS. 16(a) through 16(d) are graphs showing the classification of the states of the divided line segments at the time they are checked against the edge data;

FIGS. 17(a) and 17(b) are graphs showing line segments excluded from data selected to draw boundaries in the flowchart shown in FIG. 15; and FIGS. 18(a) through 18(d) are graphs illustrative of the manner in which the divided line segments are joined.

DETAILED DESCRIPTION OF THE PREFERRED EMBODIMENT

FIGS. 1(a) through 1(g) show the basic concept of the present invention as it is applied to a method of determining or recognizing the configuration of a path for motor vehicles.

It is assumed that a scene as shown in FIG. 1(a) is imaged by a television camera installed in a motor vehicle running along a path 1. As shown in FIG. 1(a), the path 1 has boundaries 2a, 2b adjoining a sidewalk 4, boundaries 3a, 3b adjoining a sidewalk 5, a boundary 6 adjoining a sidewalk 7 located beyond the boundary 6. The scene also includes a horizon 8 with a system 9 of mountains located therebeyond. The imaged scene is divided into two images which overlap within a common vertical region, as shown in FIGS. 6(b), 8(b), and 10(c). Each of the two divided images is converted into edge data produced by differentiation in each area therein. Using the edge data, the original image is expressed by dots (not shown). In each area, the edge data are subjected to the Hough transformation, thereby producing a group of straight lines approximating the array or distribution of feature points. The straight lines in each area are then statistically classified into groups by clustering, and the representative straight lines in the respective groups are used to determine the boundaries of the path. The original image is divided into two images because the straight lines can be detected highly accurately by way of the Hough transformation.

The representative straight lines are shown in FIGS. 1(b) and 1(c). In FIG. 1(b), the representative straight lines, denoted at L1, L2, L3, correspond respectively to the boundaries 2a, 2b, 6, respectively. In FIG. 1(c), the representative straight lines, denoted at L4, L5, L6, correspond respectively to the boundaries 3a, 3b, 6, respectively. The straight lines L1 through L6 are then united together, as described later on, into a single combination of image data as shown in FIG. 1(d). Specifically, the straight lines L2, L5 are united into a straight line L7, and the straight lines L3, L6 are united into a straight line L8.

Figure 1E:
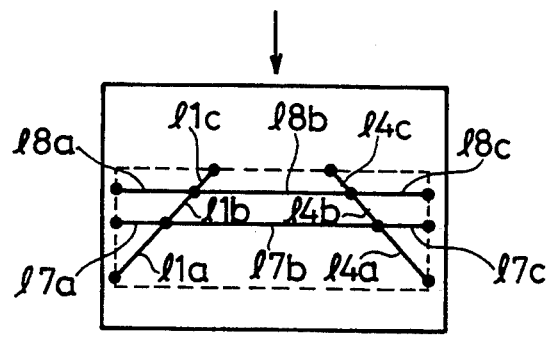
Figure 1F:
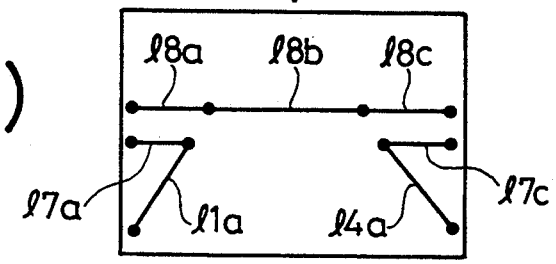

Then, points of intersection between the straight lines are determined, as described later on, and the straight lines are divided into line segments at the points of intersection. More specifically, as shown in FIG. 1(e), the straight line L1 is divided into line segments 11a, 11b, 11c, the straight line L4 line segments 14a, 14b, 14c, the straight line L7 line segments 17a, 17b, 17c, and the straight line L8 line segments 18a, 18b, 18c. The line segments are checked against edge data from the original image, as described later on, to measure the degree of agreement between the line segments and the edge data. The result of the measurement is shown in FIG. 1(f). In FIG. 1(f), the line segments 11b, 11c, 14b, 14c, 17b shown in FIG. 1(e) are removed because the degree of agreement between these line segments and the edge data is low. However, the line segments 11a, 17a corresponding to the boundaries 2a, 2b (FIG. 1(a)), the line segments 14a, 17c corresponding to the boundaries 3a, 3b, and the line segments 18a, 18b, 18c corresponding to the boundary 6 remain unremoved because the degree of agreement between these line segments and the edge data is high.

Figure 1G:
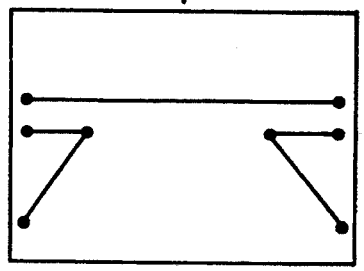

The manner in which the remaining line segments are joined is then determined, as described later on, thus producing information on the end of the path, which is accurately representative of the actual path boundaries, as shown in FIG. 1(g).

The main arithmetic operations employed in the above basic concept will now be described below.

Figure 2:
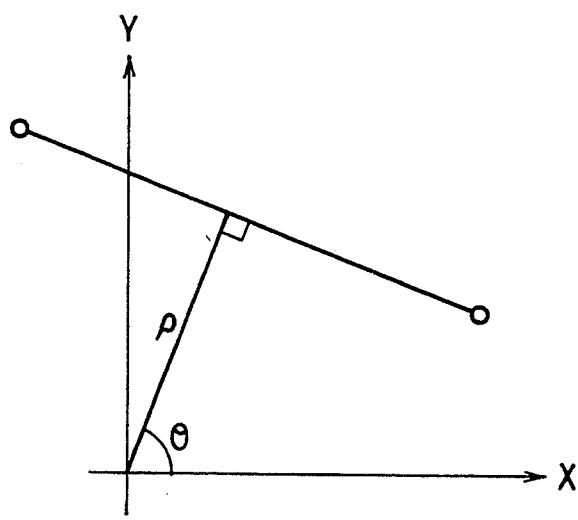
FIG. 2 is a graph showing the expression of a representative line segment used in the method of the present invention.

The two divided images shown in FIGS. 1(b) and 1(c) are united into the single combination of image data shown in FIG. 1(d) as follows: First, it is determined whether the representative line segments in the lefthand area (FIG. 1(b)) and the representative line segments in the righthand area (FIG. 1(c)), both obtained by clustering, can be united or not. If these representative line segments can be united, then they are united. As shown in FIG. 2, each of these representative line segments is expressed by the length $\rho$ of a line extending from the origin of an X-Y coordinate system or Hough-transformed coordinate system perpendicularly to the representative line segment, and an angle $\theta$ between the X-axis and the line whose length is $\rho$.

The possibility of uniting the representative line segments together is determined by checking if the lengths $\rho$ and the angles $\theta$ in the respective areas are of close values or not. If they are of close values, then the line segments can be united together, and are united depending on the gradients of the line segments. Whether a representative line segment ($\rho L$, $\theta L$) in the left area and a representative line segment ($\rho R$, $\theta R$) in the right area can be united together is determined according to the flowchart shown in FIG. 3.

If the difference between the lengths $\rho L$, $\rho R$ of the representative line segments in the lefthand and righthand areas falls within $\Delta \rho$, for example, a length corresponding to about 40 pixels of picture data, then it is determined that the representative line segments can be united together as to the lengths $\rho L$, $\rho R$. Thus, it is determined whether the lengths $\rho L$, $\rho R$ of the representative line segments satisfy the following relationships in a step 301:

$$\rho L - \Delta \rho < \rho R \text{ and } \rho R < \rho L + \Delta \rho.$$

If the above inequalities are satisfied, then it is determined whether the angles $\theta L$, $\theta R$ with respect to the representative line segments satisfy the following relationships in a step 302:

$$\theta L - \Delta \theta < \theta R \text{ and } \theta R < \theta L + \Delta \theta.$$

If the difference between the angles $\theta L$, $\theta R$ with respect to the representative line segments in the lefthand and righthand areas falls within $\Delta \theta$, for example, about 10 degrees then it is determined that the representative line segments can be united together as to the angles $\theta L$, $\theta R$.

Figure 3:
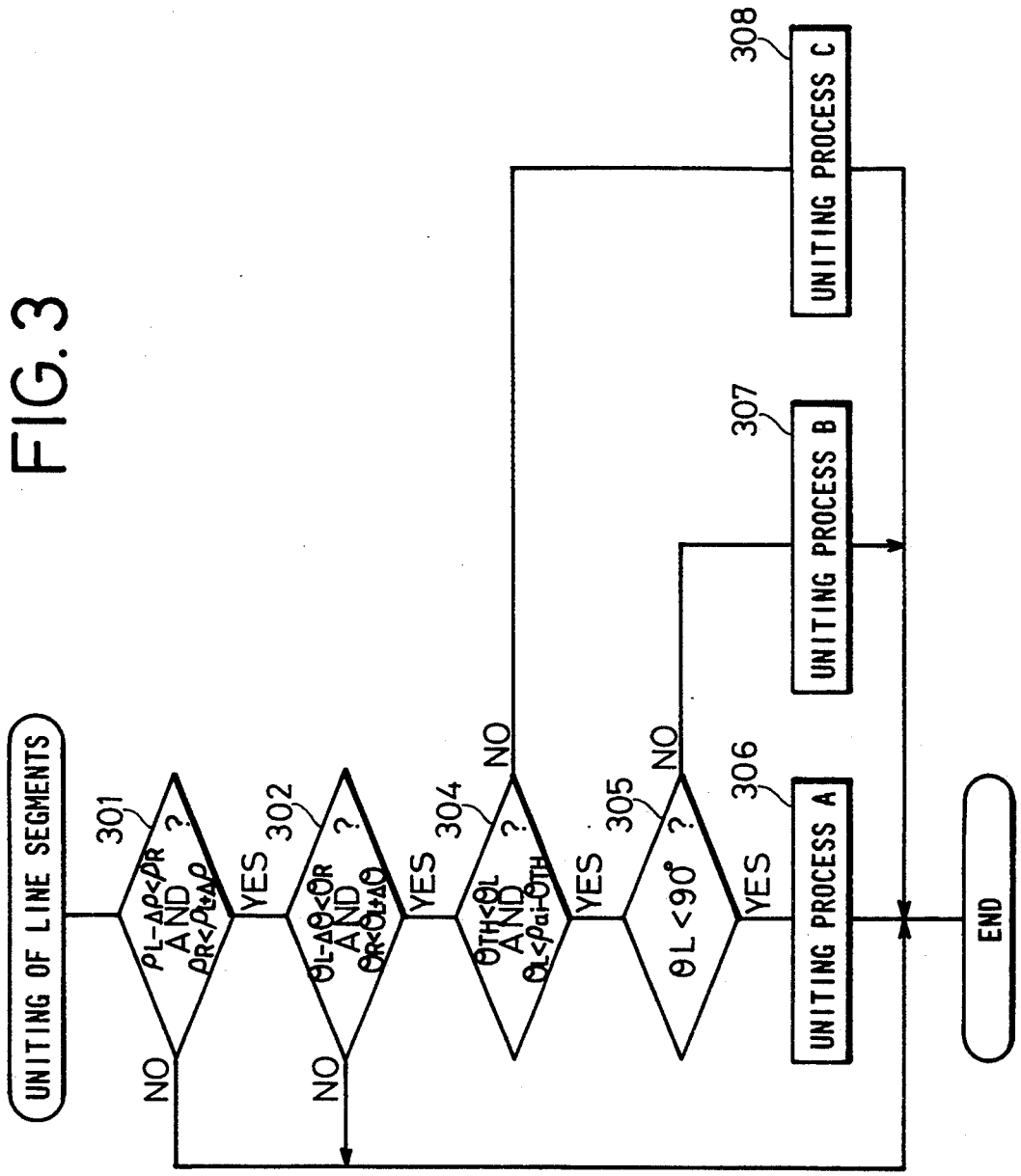
FIG. 3 is a flowchart of a procedure of uniting representative line segments together.
Figure 4:
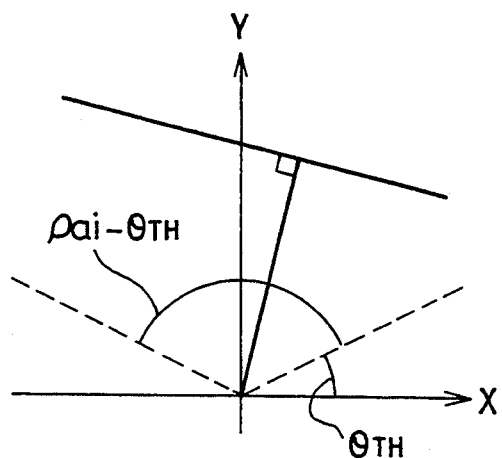
FIG. 4 is a graph illustrative of a threshold $\theta TH$ used in the flowchart shown in FIG. 3.

If the lengths ρL, ρR and the angles θL, θR of the representative line segments do not satisfy the inequalities in the steps 301, 302, then the process shown in FIG. 3 is finished. If the angles θL, θR with respect to the representative line segments satisfy the inequalities in the step 302, then it is determined whether the angle θL of the representative line segment in the lefthand area is close to the right angle or not in a step 304 by comparing the angle θL with a predetermined reference or threshold θTH and also comparing the angle θL with (Pai−θTH) according to the following inequalities:

$$\theta TH < \theta L \text{ and } \theta L < (Pai - \theta TH)$$

where θTH and (Pai−θTH) are indicated in the X-Y coordinate system shown in FIG. 4. Further, as illustrated in FIG. 4, typical values for the angle θTH can range between 25 degrees and 30 degrees, and between 125 degrees and 130 degrees for the angle ρai−θTH.

If the angle θL with respect to the representative line segment in the lefthand area satisfies the above inequalities, then it is determined whether the angle θL is smaller than 90° (θL<90°) or not in a step 305. If the angle θL is smaller than 90°, then a uniting process A is carried out in a step 306. If the angle θL is larger than 90°, then a uniting process B is carried out in a step 307. If the angle θL does not satisfy the inequalities in the step 304, then a uniting process C is carried out in a step 308.

The uniting process A will now be described below with reference to FIGS. 5 and 6(a) through 6(c).

If the angle θL with respect to the representative line segment in the lefthand area is in the range of θTH<θL<90°, as shown in FIG. 6(a), then the uniting process A is carried out. It is assumed that a representative line segment L in the lefthand area and a representative line segment R in the righthand area are relatively positioned as shown in FIG. 6(b), and that the representative line segment L has a right edge starting point XSL in terms of an X coordinate and an a left edge ending point XEL in terms of an X coordinate, and the representative line segment R has a right edge starting point XSR in terms of an X coordinate and an left edge ending point XER in terms of an X coordinate.

Figure 5:
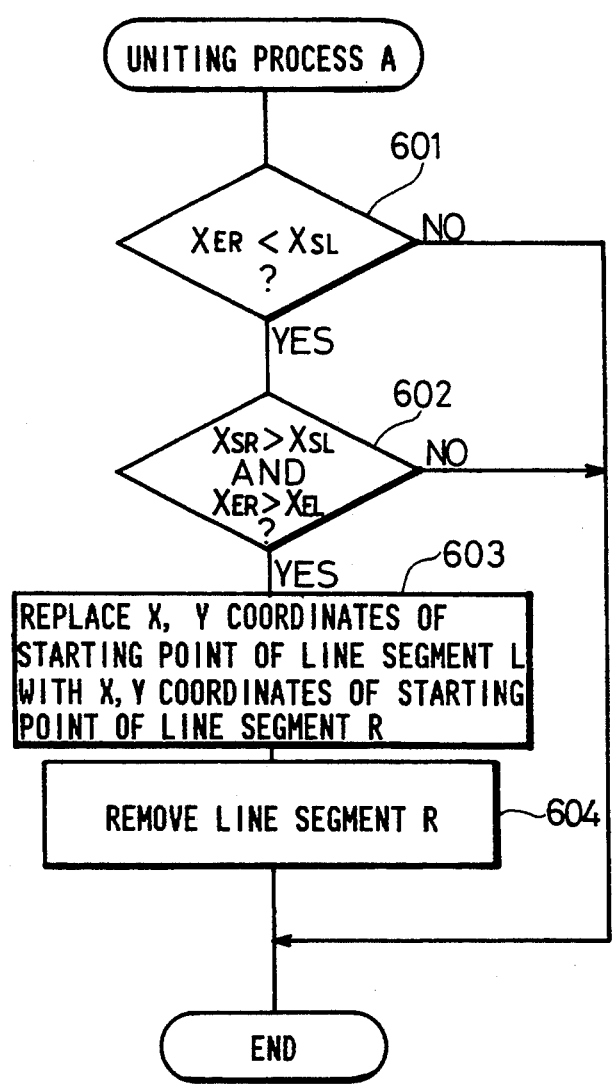

First, as shown in FIG. 5, a step 601 determines whether the ending point XER of the line segment R is smaller than the starting point XSL of the line segment L, thereby checking if these line segments have any overlapping portion. If XER<XSL and hence the line segments R, L overlap each other, then a step 602 determines whether the following inequalities are satisfied:

$$XSR > XSL \text{ and } XER < XEL.$$

If the above inequalities are satisfied, then the X and Y coordinates of the starting point of the line segment L are replaced with the X and Y coordinates of the starting point of the line segment R in a step 603. Then, the representative line segment R in the righthand area is removed in a step 604. As a result, the line segments L, R are united together into a line segment as shown in FIG. 6(c). The starting point of the united line segment corresponds to the starting point of the line segment R, and the ending point of the united line segment corresponds to the ending point of the line segment L. If the inequalities in the steps 601, 602 are not satisfied, then the uniting process A is immediately finished.

The uniting process B will now be described below with reference to FIGS. 7 and 8(a) through 8(c).

If the angle θL with respect to the representative line segment in the lefthand area is in the range of 90°≦θL<(180°−θTH), as shown in FIG. 8(a), then the uniting process B is carried out. It is assumed that a representative line segment L in the lefthand area and a representative line segment R in the righthand area are relatively positioned as shown in FIG. 8(b). The representative line segments L, R have right and left edge starting and ending points expressed in terms of X coordinates in the same manner as shown in FIG. 6(b).

First, as shown in FIG. 7, a step 801 determines whether the ending point XEL of the line segment L is smaller than the starting point XSR of the line segment R, thereby checking if these line segments have any overlapping portion. If XEL<XSR and hence the line segments L, R overlap each other, then a step 802 determines whether the following inequalities are satisfied:

$$XER > XEL \text{ and } XSR < XSL.$$

If the above inequalities are satisfied, then the X and Y coordinates of the ending point of the line segment L are replaced with the X and Y coordinates of the ending point of the line segment R in a step 803. Then, the representative line segment R in the righthand area is removed in a step 804. As a result, the line segments L, R are united together into a line segment as shown in FIG. 8(c). The starting point of the united line segment corresponds to the starting point of the line segment L, and the ending point of the united line segment corresponds to the ending point of the line segment R. If the inequalities in the steps 801, 802 are not satisfied, then the uniting process B is immediately finished.

The uniting process C will now be described below with reference to FIGS. 9(a) and 9(b) and 10(a) through 10(f).

Figure 10A:
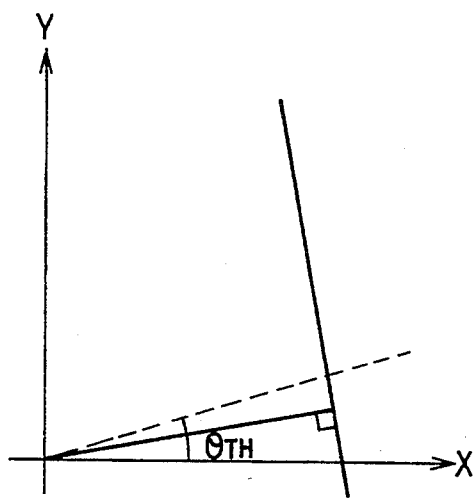
Figure 10B:
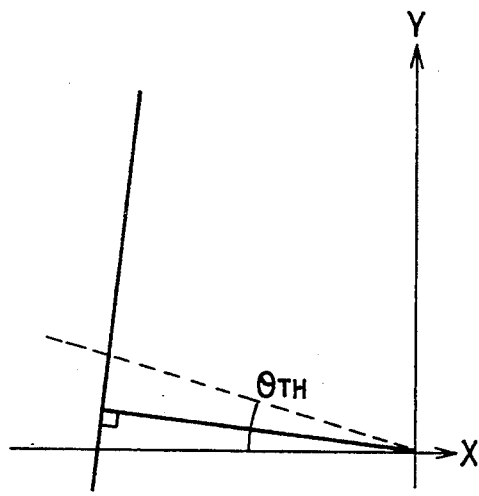
Figure 10C:
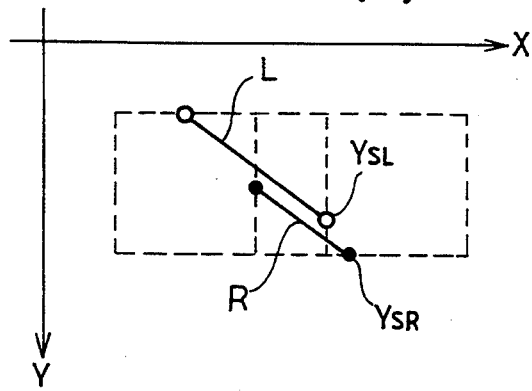
Figure 10D:
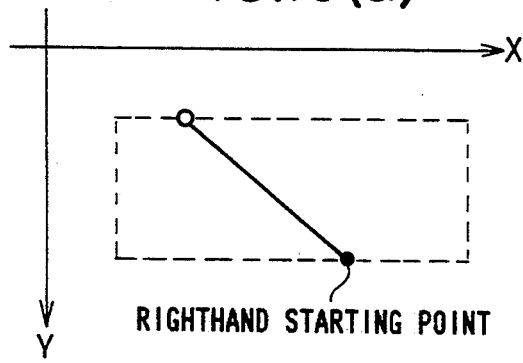
Figure 10E:
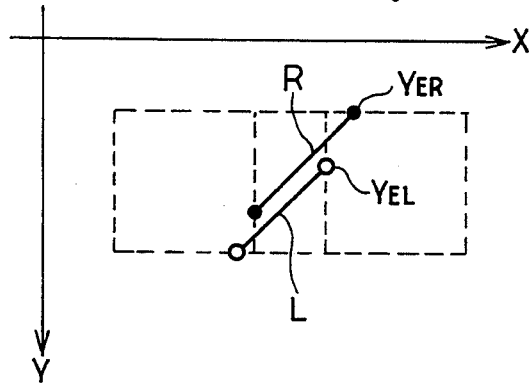
Figure 10F:
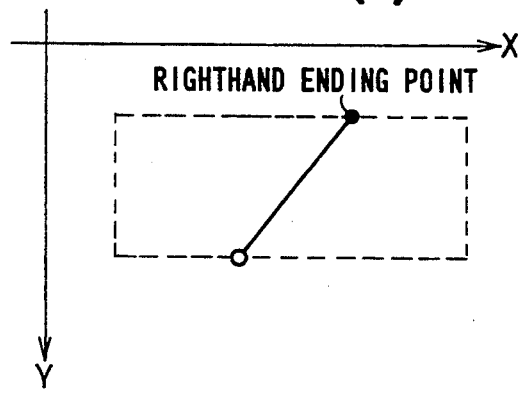

If the angle θL with respect to the representative line segment in the lefthand area is in the range of 0≦θL<θTH or (180°−θTH)≦θL<180°, as shown in FIG. 10(a), then the uniting process C is carried out. The representative line segments L, R have right and left edge starting and ending points expressed in terms of X coordinates in the same manner as shown in FIG. 6(b). It is also assumed that the representative line segment L has a starting point YSL in terms of a Y coordinate and an ending point YEL in terms of a Y coordinate, and the representative line segment R has a starting point YSR in terms of a Y coordinate and an ending point YER in terms of a Y coordinate.

It is also assumed that the representative line segments are positioned as shown in FIG. 10(a), e.g., the representative line segment L in the lefthand area and the representative line segment R in the righthand area are relatively positioned as shown in FIG. 10(c). In this case, a uniting process C1 as shown in FIG. 9(a) is carried out.

First, a step 1001 determines whether the starting point YSL of the line segment L is larger than the starting point YSR of the line segment R. If YSL>YSR (as shown in FIG. 10(c)), then the starting point of the line segment L is replaced with the starting point of the line segment R in a step 1002. Specifically, the starting point XSL in terms of an X coordinate of the line segment L is replaced with the starting point XSR in terms of an X coordinate of the line segment R, and the starting point YSL in terms of a Y coordinate of the line segment L is replaced with the starting point YSR in terms of a Y coordinate of the line segment R. Then, the line segment R is removed in a step 1003. The line segments L, R are now united into a line segment as shown in FIG. 10(*d*). The starting point of the united line segment corresponds to the starting point of the line segment R, and the ending point of the united line segment corresponds to the ending point of the line segment L. If YSL is not smaller than YSR in the step 1001, then the starting point of the line segment L is employed as the starting point of the united segment in a step 1004, and then the line segment R is removed in the step 1003, so that the line segments are united.

It is assumed that the representative line segments are positioned as shown in FIG. 10(*b*), e.g., the representative line segment L in the lefthand area and the representative line segment R in the righthand area are relatively positioned as shown in FIG. 10(*e*). In this case, a uniting process C2 as shown in FIG. 9(*b*) is carried out.

First, a step 1005 determines whether the ending point YEL of the line segment L is smaller than the ending point YER of the line segment R. If YEL<YER (as shown in FIG. 10(*e*)), then the ending point of the line segment L is replaced with the ending point of the line segment R in a step 1006. Specifically, the ending point XEL in terms of an X coordinate of the line segment L is replaced with the ending point XER in terms of an X coordinate of the line segment R, and the ending point YEL in terms of a Y coordinate of the line segment L is replaced with the ending point YER in terms of a Y coordinate of the line segment R. Then, the line segment R is removed in a step 1007. The line segments L, R are now united into a line segment as shown in FIG. 10(*f*). The starting point of the united line segment corresponds to the starting point of the line segment L, and the ending point of the united line segment corresponds to the ending point of the line segment R. If YEL is not greater than YER in the step 1005, then the ending point of the line segment L is employed as the ending point of the united segment in a step 1008, and then the line segment R is removed in the step 1007, so that the line segments are united.

The division of the straight lines into the line segments as shown in FIG. 1(*e*) will be described below with reference to FIGS. 11, 12(*a*) and 12(*b*). It is assumed that representative line segments L1, L2 as shown in FIG. 12(*a*) are obtained as a result of one of the uniting processes described above. In this case, a line division process as shown in FIG. 11 is carried out. The representative line segment L1 is defined as a first line segment, and the other representative line segment L2 as a second line segment in a step 1201. Then, a step 1202 determines whether the first line segment L1 and the second line segment L2 are parallel to each other or not. If the first and second line segments L1, L2 are not parallel to each other, then since there is no point of intersection between these line segments, the line division process is finished. Because the first and second line segments L1, L2 are however not parallel to each other as shown in FIG. 12(*a*), they intersect with each other at a point C. A step 1204 determines the X and Y coordinates (XC, YC) of the point C of intersection. Then, it is determined in a step 1205 whether the point C of intersection is positioned between the starting and ending points of the first line segment L1 and between the starting and ending points of the second line segment L2.

If the point C of intersection is not positioned between the starting and ending points of the line segments L1, L2 then the line division process is brought to an end. If the point C of intersection is position on the first and second line segments L1, L2, then, as shown in FIG. 12(*b*), the representative line segment L1 is divided into line segments l1, l2 by the point C of intersection, and the representative line segment L2 is divided into line segments l3, l4 in a step 1206. In this manner, points of intersection between various representative line segments are determined, and data on the determined points of intersection are stored. The above process is effected with respect to the representative line segments which are displayed as shown in FIG. 1(*e*), thus collecting the data on the points of intersection with respect to the respective representative line segments.

Based on the points of intersection thus determined, each of the representative line segments is separated into a plurality of line segments. For example, it is assumed that a representative line segment L has points C1, C2 of intersection as shown in FIG. 13(*a*). The representative line segment L is severed into three line segments La, Lb, Lc by the points C1, C2 of intersection as shown in FIGS. 13(*b*), 13(*c*), and 13(*d*).

The divided line segments are then checked against the edge data produced from the original image (FIG. 1(*a*)) as follows: It is assumed that a divided line segment d as shown in FIG. 14(*a*) has a starting point S having X and Y coordinates (SX, SY), an ending point E having X and Y coordinates (EX, EY), a slope A, an intercept B, and is inclined at an angle $\theta$ with respect to the X-axis.

The divided line segment d is checked against the edge data of the original image by scanning an edge image over a constant width W of pixels, for example ±2–4 pixels on both sides bordering the line segment, across the line segment d in the direction indicated by the arrows in FIG. 14(*b*). More specifically, the intensity of the edge point of each pixel scanned is compared with a predetermined threshold, and the edge points whose intensity is higher than the predetermined threshold are counted. The threshold calculation can be performed according to previously disclosed methods, for example as disclosed by Ootsu Nobuyuki, "Automatic Threshold Determination Method based on Discrimination and Least Square Standards," Shingakuron (D), Volume J63D, pp. 349–356 (April, 1980). If the ratio of the count to the length l of the line segment d is greater than a predetermined ratio, for example, about 0.15, then it is determined that the line segment d corresponds to a boundary of the actual path. The degree of agreement between the divided line segment d and the edge data is expressed as follows:

Degree of agreement = [the number of edge points whose intensity is higher than the threshold]/ [the length *l* of the line segment *d*]. (1)

In the case of measurements taken from an actual planar surface, the above ratio equals about 0.15. Thus, if the measured ratio is greater than a predetermined ratio of about 0.15, the degree of agreement is determined to be acceptable. Since the line segment d is represented by quantized data, the length l of the line segment d may be determined from the number of scanning lines across the width W. Alternatively, the length l may represented by |SX−EX| or |SY−EY|, whichever is larger, or may be given by:

$$l = [(SX-EX)^2 + (SY-EY)^2]^{\frac{1}{2}} \qquad (2).$$

The degree of agreement is calculated with respect to different line segments to be measured whose states are classified as shown in FIGS. 16(a) through 16(d). The degree of agreement is calculated according to the flowchart shown in FIG. 15. It is assumed that the edge point of each line segment whose degree of agreement is to be measured has X and Y coordinates (RX, RY).

Figure 16A:
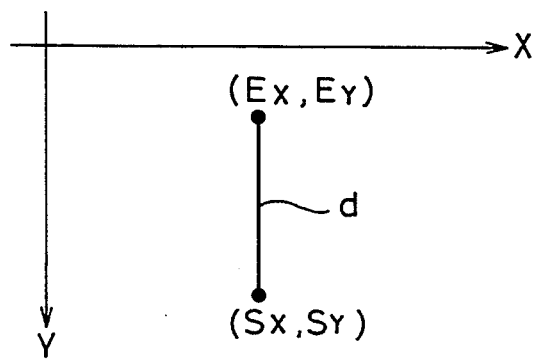

A counter for counting edge points whose intensity is higher than a predetermined threshold is cleared in a step 1601. Then, a step 1602 determines whether the angle θ of inclination of the line segment d to be checked with respect to the X-axis is 90° or not. If the angle θ is 90° and hence the line segment d is vertical, then the line segment d is in a state as shown in FIG. 16(a). In this case, the Y coordinate RY of the edge point to be measured varies from EY to SY in a step 1603, and the X coordinate RX varies by the width W across a constant value RXO in a step 1604. Then, a step 1605 determines whether the scanned area lies in the range of the image, in other words, whether the are to be scanned can fit within the divided image area which, for example, is about 511 by 511 pixels on a typical video display. If the scanned area lies outside of the image, then the process is finished. If the scanned area lies within the image, the intensity of the edge point at the coordinates (RX, RY) is read in. If the intensity is higher than a predetermined threshold, then the counter for counting edge points is counted up in a step 1607. The step 1607 is carried out for every edge point existing in the scanned area, so that the number of all edge points whose intensity is higher than the threshold is measured along the line segment d.

Figure 16B:
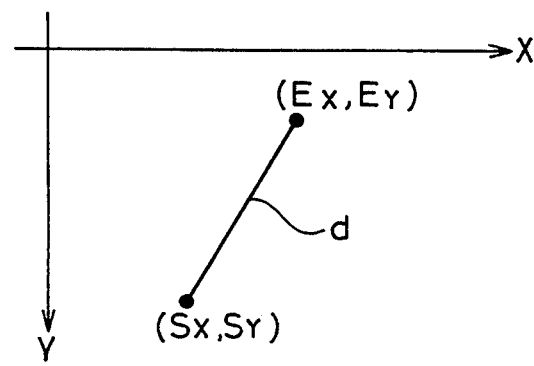

If the angle θ of the line segment d is not 90° in the step 1602, then a step 1608 determines whether the angle θ is smaller than 45° (θ<45°) or larger than 135° (θ>135°), thus determining whether the line segment d has a vertical tendency or not. If the line segment d has a vertical tendency, then the line segment d is in a state as shown in FIG. 16(b) and the Y coordinate RY of the edge point to be checked varies from EY to SY in a step 1609. A value D is produced by dividing the intercept B of the line segment d by the slope A (D=B/A), and a value RXO is determined according to RXO=-RY/A+D. The X coordinate RX of the edge point varies by the width W across the value RXO in a step 1610. Then, the step 1605 determines whether the scanned area lies in the range of the image. If the scanned area lies within the image, the intensity of the edge point at the coordinates (RX, RY) is read in, and if the intensity is higher than a predetermined threshold, then the counter for counting edge points is counted up in the step 1607.

Figure 16C:
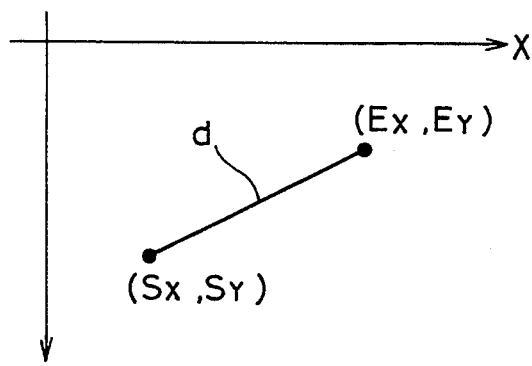

If the angle θ does not satisfy the conditions in the step 1608, and hence the line segment d does not have a vertical tendency, then a step 1611 determines whether the X coordinate SX of the starting point of the line segment d is smaller than the X coordinate EX of the ending point E thereof or not (SX<EX). If the X coordinate SX of the starting point S is smaller than the X coordinate EX of the ending point E, then the line segment d is in a state as shown in FIG. 16(c). In this case, the X coordinate RX of the edge point to be checked varies from SX to EX in a step 1612. The Y coordinate RY varies by the width W across a value RYO=RX·A+B in a step 1613. Then, the step 1605 determines whether the scanned area lies in the range of the image. If the scanned area lies within the image, the intensity of the edge point at the coordinates (RX, RY) is read in, and if the intensity is higher than a predetermined threshold, then the counter for counting edge points is counted up in the step 1607.

Figure 16D:
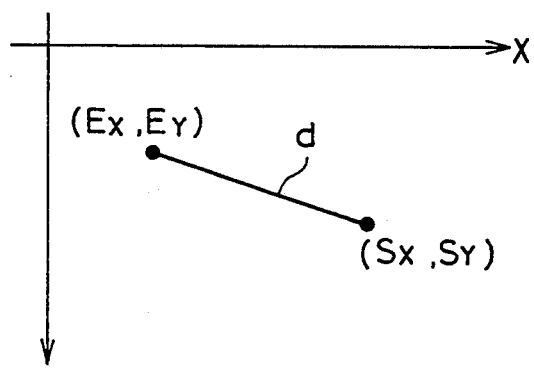

If the X coordinate SX of the starting point S is larger than the X coordinate EX of the ending point E in the step 1611, the line segment d is in a state as shown in FIG. 16(d). In this case, the X coordinate RX of the edge point to be checked varies from EX to SX in a step 1614. The Y coordinate RY varies by the width W across a value RYO=RX·A+B in a step 1615. Then, the step 1605 determines whether the scanned area lies in the range of the image. If the scanned area lies within the image, the intensity of the edge point at the coordinates (RX, RY) is read in, and if the intensity is higher than a predetermined threshold, then the counter for counting edge points is counted up in the step 1607.

After the edge points whose intensity is higher than the predetermined threshold have been counted by the counter, the length l of the line segment d is determined according to the equation (2) or one of the alternative processes in a step 1616. Then, a step 1617 determines whether the length l is smaller than a predetermined minimum value or not, wherein the minimum value corresponds with a length converted from a distance taken from an actual planar surface, for example, about 2 to 5 meters. If the length l is larger than the minimum value then the process is finished If the length Z is smaller than the minimum value, then a step 1619 determines whether neither of the opposite ends of the line segment d has a point of connection to another line segment. If either of the opposite ends of the line segment d has a point of connection, then the line segment d is determined to be effective to extract a boundary of the path in a step 1620.

If neither of the opposite ends of the line segment d has a point of connection to another line segment, then the line segment d is determined to be ineffective to extract a path boundary, and is excluded from the group of line segments to be selected, in a step 1621. Line segments to be excluded are shown by way of example in FIGS. 17(a) and 17(b). Specifically, a line segment dl shown in FIG. 17(a) is not excluded from the group of line segments to be selected because only one of the opposite ends thereof has no point of connection. A line segment dl shown in FIG. 17(b) is excluded from the group of line segments to be selected because both of the opposite ends thereof have no point of connection.

Then, the ratio of the number of the edge points whose intensity is higher than the predetermined threshold to the length l of the line segment d is calculated according to the equation (1), thereby determining the degree of agreement in a step 1622. Based on the determined degree of agreement, the effectiveness of the line segment d is ascertained, i.e., it is determined whether the line segment d corresponds to a boundary of the actual path.

The manner in which the divided line segments are joined, as shown in FIG. 1(g), is determined as described below.

Figure 18A:
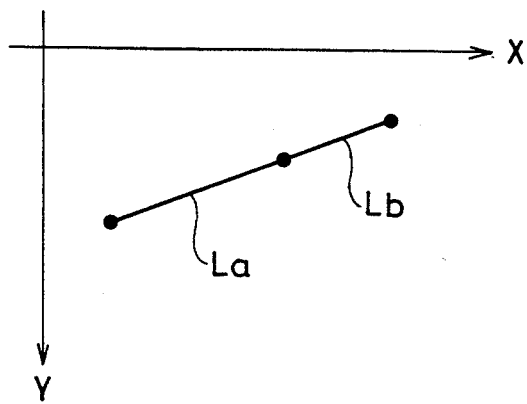
Figure 18B:
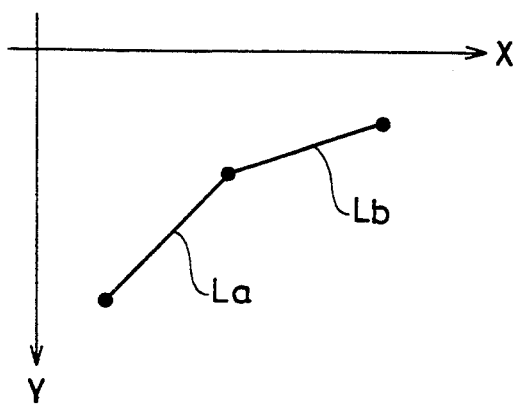
Figure 18C:
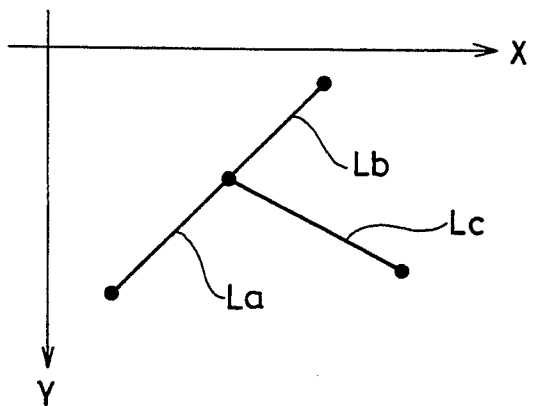
Figure 18D:
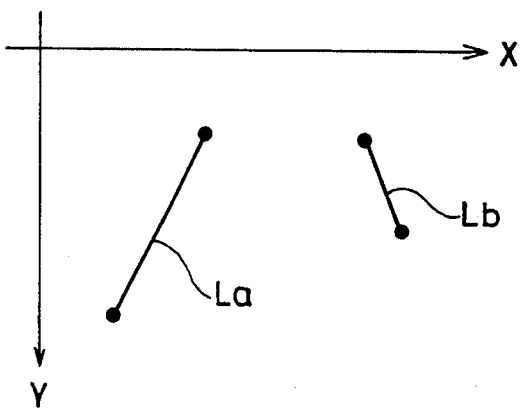

The selected line segments may be joined to other in different patterns as shown in FIGS. 18(a) through 18(d). FIG. 18(a) shows a pattern in which selected line segments La, Lb originally come from one representative line segment. The line segments La, Lb shown in FIG. 18(a) are joined into one line segment. FIG. 18(b) shows a pattern in which selected line segments La, Lb originate from different representative line segments. In this case, the relationship in which the line segments La, Lb are joined is converted into data, which are stored. According to the pattern shown in FIG. 18(c), selected line segments La, Lb, which derive from one representative line segment, are joined to each other at a junction to which another selected line segment Lc is joined. With this pattern, the relationship in which the line segments La, Lb, Lc are joined is converted into data, which are stored. FIG. 18(d) illustrates a pattern in which selected line segments La, Lb are originally not joined but separated. The relationship in which these line segments La, Lb are joined is also converted into data, which are stored. In the pattern of FIG. 18(d), the number of points of connection between line segments is zero.

In the above embodiment, the original image is divided into two image areas, and the data from the two image areas are processed. However, the original image may not be divided, but the array or distribution of feature points may be determined directly from the original image, and a group of straight lines approximating the determined array of feature points may be determined for the recognition of the path. According to such a modification, the step of dividing the original image into a plurality of image areas and the step of combining the divided image areas into a single image are omitted. The modified arrangement also offers the same advantages as those of the illustrated embodiment.

With the present invention, as described above, since the divided line segments are checked against the feature points of the original image data, the boundaries of the path can easily and quickly be recognized irrespective of the configuration of the path.

Therefore, even if the path is curved or branched, the method of the present invention does not require sequential steps which would otherwise be needed to determine the configuration of the path, but can easily and quickly determine the boundaries of the path. The method of determining the configuration of a path for motor vehicles according to the present invention is thus well applicable to the control of running or guidance of motor vehicles such as automobiles, which requires data processing in a short period of time.

Although a certain preferred embodiment has been shown and described, it should be understood that many changes and modifications may be made therein without departing from the scope of the appended claims.

What is claimed is:

1. A method of determining the configuration of a path for motor vehicles on roadways in which extraneous clutter and noise is relatively minimal, comprising the steps of:

extracting straight lines from a group of straight lines which have been redetermined from original image data of the path based on an array of feature points included in said original image data, wherein the extracted straight lines determine boundaries of the path;

dividing the extracted straight lines into a plurality of line segments, each of said line segments being defined by points of intersection between the straight lines; and comparing said line segments with the feature points of said original image data to determine whether the line segments correspond to the boundaries of the path.

2. A method according to claim 1, wherein said step of extracting straight lines comprises the steps of determining whether the X coordinate of the starting point of one straight line is larger than the X coordinate of the starting point of another straight line, and whether the x coordinate of the ending point of said one straight line is larger than the X coordinate of the ending point of said other straight line, and determining a straight line which interconnects the starting point of said one straight line and the ending point of said other straight line, to be an effective straight line if said X coordinate of the starting point of said one straight line is larger than said X coordinate of the starting point of said other straight line and said X coordinate of the ending point of said one straight line is larger than said X coordinate of the ending point of said other straight line.

3. A method according to claim 1, wherein said step of extracting straight lines comprises the steps of determining whether the Y coordinate of the starting point of one straight line is larger than the Y coordinate of the starting point of another straight line, and whether the Y coordinate of the ending point of said one straight line is larger than the Y coordinate of the ending point of said other straight line, and determining a straight line which interconnects the starting end of said one straight line and the ending point of said other straight line, to be an effective straight line if said Y coordinate of the starting point of said one straight line is larger than said Y coordinate of the starting point of said other straight line and said Y coordinate of the ending point of said one straight line is larger than said Y coordinate of the ending point of said other straight line.

4. A method according to claim 1, wherein said step of extracting straight lines comprises the steps of determining whether the Y coordinate of the starting point of one straight line is smaller than the Y coordinate of the starting point of another straight line, and whether the Y coordinate of the ending point of said one straight line is smaller than the Y coordinate of the ending point of said other straight line, and determining a straight line which interconnects the ending point of said one straight line and the starting point of said other straight line, to be an effective straight line if said Y coordinate of the starting point of said one straight line is smaller than said Y coordinate of the starting point of said other straight line and said Y coordinate of the ending point of said one straight line is smaller than said Y coordinate of the ending point of said other straight line.

5. A method according to claim 1, wherein said step of dividing the extracted straight lines comprises the steps of defining one straight line as a first line segment and another straight line as a second line segment, determining whether said first and second lien segments are parallel to each other, determining a point of intersection between said first and second line segments if the first and second line segments are not parallel to each other, determining whether the point of intersection is positioned between the starting and ending points of said first and second line segments, and dividing said first and second line segments by the point of intersection if the point of intersection is positioned between the starting and ending points of the first and second line segments.

6. A method according to claim 1, wherein said step of comparing said line segments comprises the steps of scanning an edge image over a predetermined width across a line segment, comparing the intensity of the edge point of each dot which is scanned, with a predetermined threshold, counting edge points whose intensity is higher than said predetermined threshold, calculating the ratio of the number of the counted edge points to the length of the line segment, and determining whether the line segment corresponds to a boundary of the path based on the calculated ratio.

7. A method of determining the configuration of a path for motor vehicles on roadways in which extraneous clutter and noise is relatively minimal, comprising the steps of:
 extracting straight lines from a group of straight lines which have been predetermined from original image data of the path based on an array of feature points included in said original image data, the original image data is being divided into a plurality of image areas, wherein the extracted straight lines determine boundaries of the path in each of said areas;
 uniting the extracted straight lines in each of said areas into a single combination of image data representing a single straight line;
 dividing said single straight line into a plurality of line segments; and
 comparing said line segments with the feature points of said original image data to determine whether the line segments correspond to the boundaries of the path.

8. A method according to claim 7, wherein said step of extracting straight lines comprises the steps of determining whether the X coordinate of the starting point of one straight line is larger than the X coordinate of the starting point of another straight line, and whether the X coordinate of the ending point of said one straight line is larger than the X coordinate of the ending point of said other straight line, and determining a straight line which interconnects the starting point of said one straight line and the ending point of said other straight line, to be an effective straight line if said X coordinate of the starting point of said one straight line is larger than said X coordinate of the starting point of said other straight line and said X coordinate of the ending point of said one straight line is larger than said X coordinate of the ending point of said other straight line.

9. A method according to claim 7, wherein said step of extracting straight lines comprises the steps of determining whether the Y coordinate of the starting point of one straight line is larger than the Y coordinate of the starting point of another straight line, and whether the Y coordinate of the ending point of said one straight line is larger than the Y coordinate of the ending point of said other straight line, and determining a straight line which interconnects the starting end of said one straight line and the ending point of said other straight line, to be an effective straight line if said Y coordinate of the starting point of said one straight line is larger than said Y coordinate of the starting point of said other straight line and said Y coordinate of the ending point of said one straight line is larger than said Y coordinate of the ending point of said other straight line.

10. A method according to claim 7, wherein said step of extracting straight lines comprises the steps of determining whether the Y coordinate of the starting point of one straight line is smaller than the Y coordinate of the starting point of another straight line, and whether the Y coordinate of the ending point of said one straight line is smaller than the Y coordinate of the ending point of said other straight line, and determining a straight line which interconnects the ending point of said one straight line and the starting point of said other straight line, to be an effective straight line if said Y coordinate of the starting point of said one straight line is smaller than said Y coordinate of the starting point of said other straight line and said Y coordinate of the ending point of said one straight line is smaller than said Y coordinate of the ending point of said other straight line.

11. A method according to claim 7, wherein said step of dividing said single straight line comprises the steps of defining one straight line as a first line segment and another straight line as a second line segment, determining whether said first and second line segments are parallel to each other, determining a point of intersection between said first and second line segments if the first and second line segments are not parallel to each other, determining whether the point of intersection is positioned between the stating and ending points of said first and second line segments, and dividing said first and second line segments by the point of intersection if the point of intersection is positioned between the starting and ending points of the first and second line segments.

12. A method according to claim 7, wherein said step of comparing said line segments comprises the steps of scanning an edge image over a predetermined width across a line segment, comparing the intensity of the edge point of each dot which is scanned, with a predetermined threshold, counting edge points whose intensity is higher than said predetermined threshold, calculating the ratio of the number of the counted edge points to the length of the line segment, and determining whether the line segment corresponds to a boundary of the path based on the calculated ratio.

* * * * *